(No Model.)

A. FRIEDRICK.
LEAD SASH BAR.

No. 271,696. Patented Feb. 6, 1883.

Witnesses.
Fred E. Lockwood
James P. Stevenson

Inventor
Alphonse Friedrick

UNITED STATES PATENT OFFICE.

ALPHONSE FRIEDRICK, OF BROOKLYN, NEW YORK.

LEAD SASH-BAR.

SPECIFICATION forming part of Letters Patent No. 271,696, dated February 6, 1883.

Application filed October 10, 1881. (No model.)

*To all whom it may concern:*

Be it known that I, ALPHONSE FRIEDRICK, a citizen of the United States, residing at Nos. 16 and 18 Hoyt street, Brooklyn, in the county of Kings and State of New York, have invented a new and useful improvement in lead sash-bars used in the art of glazing or joining plain or ornamental glass of various and uneven thicknesses in either straight, curved, or irregular lines in making decorated windows, screens, and panels; and I do hereby declare the following to be a full, clear, and exact description of the invention, which will enable others skilled in the art to which it appertains to make and use the same.

Heretofore plain and ornamental glass has been glazed, where lead sash are used, by means of bars rolled out of lead in such manner as to form a groove of uniform size and shape in each side of the bar to receive the glass. When glass of various and uneven thicknesses is to be glazed by means of the sash-bars now in use the groove which is of proper size to receive the thick glass is too large to receive and secure the thin glass, or vice versa.

My invention consists of a continuous sash-bar, to be rolled out of lead, soft metal, or composition of metals, so as to form, when viewed on section, a flat or half-round bar with two flanges extending from the center of the flat bar, or from the center of the flat side of the half-round bar, as the case may be, thus forming a rabbet on each side of the two flanges to receive the glass. After the glass of various and uneven thicknesses has been placed in the rabbets thus formed the flanges are then turned down, pressed firmly to the glass, and the edges of the flanges trimmed off so as to show a uniform projection over the several thicknesses of glass. The seam or joint between the two flanges is then to be floated over and soldered in the usual manner of soldering, thus making the glazing uniform, safe, and tight.

Figure 1:
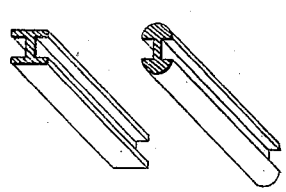
Figure 2:
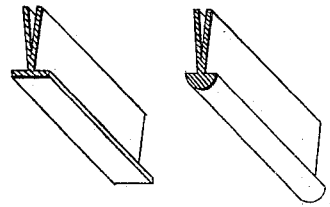
Figure 3:
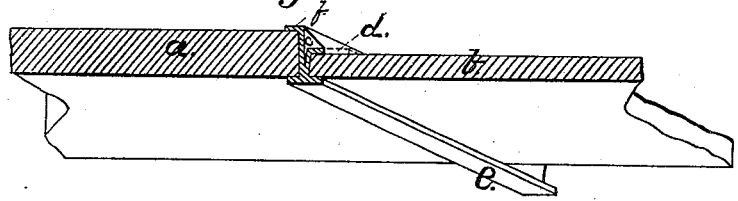
Figure 4:
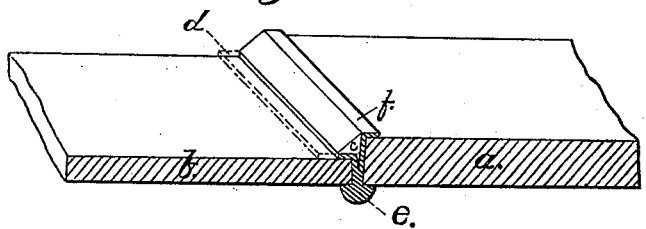

Figure 1 in the accompanying drawings represents the two forms of lead sash-bar now in use. Fig. 2 represents the improved forms of lead sash-bars ready for use. Figs. 3 and 4 represent thick glass, *a*, and thin glass, *b*, glazed by means of the improved lead sash-bar *e*, in which *d* represents the flange, which is trimmed off so as to cover the thin glass the same distance and be uniform with the flange *f*, covering the thick glass. The solder between the flanges is represented by *c*.

I am aware that flexible soft metal has been applied to heavy skylight-rafters in such manner as to leave two vertical margins between the panes of glass, as the latter are laid, and to be turned down upon the glass, as in English Patents Nos. 2,830 and 3,091 of 1880; but such I do not claim, as they are not my invention; but, Having fully described my invention, its object, and the manner of using the same, what I desire to claim and secure by Letters Patent is—

The sash-bar *e*, formed with rabbets at each side of a middle rib, and with flexible flanges *f d* upon the rib, substantially as and for the purposes set forth.

ALPHONSE FRIEDRICK.

Witnesses:
FRED. E. LOCKWOOD,
JAMES P. STEVENSON.